(12) United States Patent
Wasilewski et al.

(10) Patent No.: US 9,809,150 B2
(45) Date of Patent: Nov. 7, 2017

(54) HEADLAMP ASSEMBLY

(71) Applicant: GM GLOBAL TECHNOLOGY OPERATIONS LLC, Detroit, MI (US)

(72) Inventors: Andrzej Wasilewski, Shelby Township, MI (US); Richard Tepper, Grosse Pointe Park, MI (US); Jeffrey T. Zawacki, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 92 days.

(21) Appl. No.: 14/925,505

(22) Filed: Oct. 28, 2015

(65) Prior Publication Data

US 2017/0120799 A1    May 4, 2017

(51) Int. Cl.
*B60Q 1/068* (2006.01)
*B60Q 1/00* (2006.01)
*F21S 8/10* (2006.01)

(52) U.S. Cl.
CPC ........... *B60Q 1/068* (2013.01); *B60Q 1/0041* (2013.01); *B60Q 1/0683* (2013.01); *F21S 48/1742* (2013.01); *B60Q 2200/36* (2013.01); *F21S 48/1258* (2013.01); *F21S 48/328* (2013.01)

(58) Field of Classification Search
CPC .... B60Q 1/068; B60Q 1/0041; B60Q 1/0683; B60Q 1/06; F21S 48/1742; F21S 48/1104; F21V 14/02; F21V 19/02; F21V 21/14
See application file for complete search history.

(56) References Cited

U.S. PATENT DOCUMENTS

| | | | | |
|---|---|---|---|---|
| 7,244,057 B2 * | 7/2007 | Watanabe | ............ | B60Q 1/0041 362/507 |
| 7,621,664 B2 * | 11/2009 | Nicolai | ................ | B60Q 1/0041 362/294 |
| 2013/0051058 A1 * | 2/2013 | Bako | ...................... | B60Q 1/068 362/523 |

* cited by examiner

*Primary Examiner* — Bao Q Truong
(74) *Attorney, Agent, or Firm* — Quinn IP Law

(57) ABSTRACT

A light assembly includes a carrier. A first high beam light module is rotatably attached to the carrier for rotation relative to the carrier about a first high beam horizontal axis. A first low beam light module is rotatably attached to the carrier for rotation relative to the carrier about a first low beam horizontal axis. The first high beam horizontal axis and the first low beam horizontal axis are parallel with each other. A bar interconnects the first high beam light module and the first low beam light module. An adjustment drive is coupled to the bar. The adjustment drive is operable to move the bar along a bar axis. Movement of the bar along the bar axis simultaneously rotates the first high beam light module about the first high beam horizontal axis, and the first low beam light module about the first low beam horizontal axis.

19 Claims, 3 Drawing Sheets

HEADLAMP ASSEMBLY

TECHNICAL FIELD

The disclosure generally relates to a light assembly, and more particularly to a headlamp assembly for a vehicle.

BACKGROUND

Vehicles may include a light assembly disposed near a forward end of the vehicle for illuminating the forward direction of the vehicle. These forward facing light assemblies may be referred to as a headlamp assembly or a headlight. Each light assembly may be equipped with multiple LED light modules used for a high beam function, and multiple LED light modules used for a low beam function. All of the light modules need to be adjustable relative to a horizontal plane so that they all may be aimed at the appropriate angle relative to the horizontal plane to provide the proper illumination for the vehicle.

SUMMARY

A headlamp assembly for a vehicle is provided. The headlamp assembly includes a carrier. A first light module is rotatably attached to the carrier. The first light module is rotatable relative to the carrier about a first horizontal axis. A second light module is rotatably attached to the carrier. The second light module is rotatable relative to the carrier about a second horizontal axis. The first horizontal axis and the second horizontal axis are parallel with each other. A main actuator bar interconnects the first light module and the second light module. An adjustment drive is coupled to the main actuator bar. The adjustment drive is operable to move the main actuator bar along a bar axis. Movement of the main actuator bar along the bar axis simultaneously rotates the first light module about the first horizontal axis, and the second light module about the second horizontal axis.

A light assembly is also provided. The light assembly includes a carrier, a plurality of first light modules, and a plurality of second light modules. Each of the plurality of first light modules is rotatably attached to the carrier, and is rotatable relative to the carrier about a respective horizontal module axis. Each of the plurality of second light modules is rotatably attached to the carrier, and is rotatable relative to the carrier about a respective horizontal module axis. The plurality of first light modules and the plurality of second light modules are stacked vertically relative to each other along a vertical rotation axis. A main actuator bar extends along a bar axis. The main actuator bar interconnects the plurality of first light modules and the plurality of second light modules. The main actuator bar includes horizontal threads spaced from each other along the bar axis. An adjustment drive, defining annular threads, is disposed in meshing engagement with the horizontal threads of the main actuator bar. Rotation of the adjustment drive about a shaft axis moves the main actuator bar along the bar axis to simultaneously rotate the plurality of first light modules and the plurality of second light modules about their respective horizontal module axis.

Accordingly, rotation of the adjustment drive causes the main actuator bar to move along the bar axis. Movement of the main actuator bar along the bar axis causes each individual light module, e.g., high beam light modules or low beam light modules, to rotate about their respective horizontal module axis, which changes the orientation of each respective light module relative to a horizontal plane to simultaneously aim all of the light modules. Rotation of the adjustment drive in a first rotational direction causes the light modules to rotate downward, whereas rotation of the adjustment drive in a second, opposite rotational direction causes the light modules to rotate upward. Because the individual light modules rotate relative to the carrier, the carrier does not need to move or rotate to aim the light modules, thereby reducing the packaging requirements of the light assembly, and enabling desirable design aesthetics.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," "vertical", "horizontal", etc., are used descriptively for the figures, and do not represent limitations on the scope of the disclosure, as defined by the appended claims. Furthermore, the teachings may be described herein in terms of functional limitations.

Referring to the Figures, wherein like numerals indicate like parts throughout the several views, a light assembly is generally shown at 20. The light assembly 20 may be configured for any suitable use. For example, the light assembly 20 may be configured as a front headlamp for a vehicle, such as shown in the Figures. However, it should be appreciated that the light assembly 20 may be configured for some other application that use amiable light modules.

Figure 1:
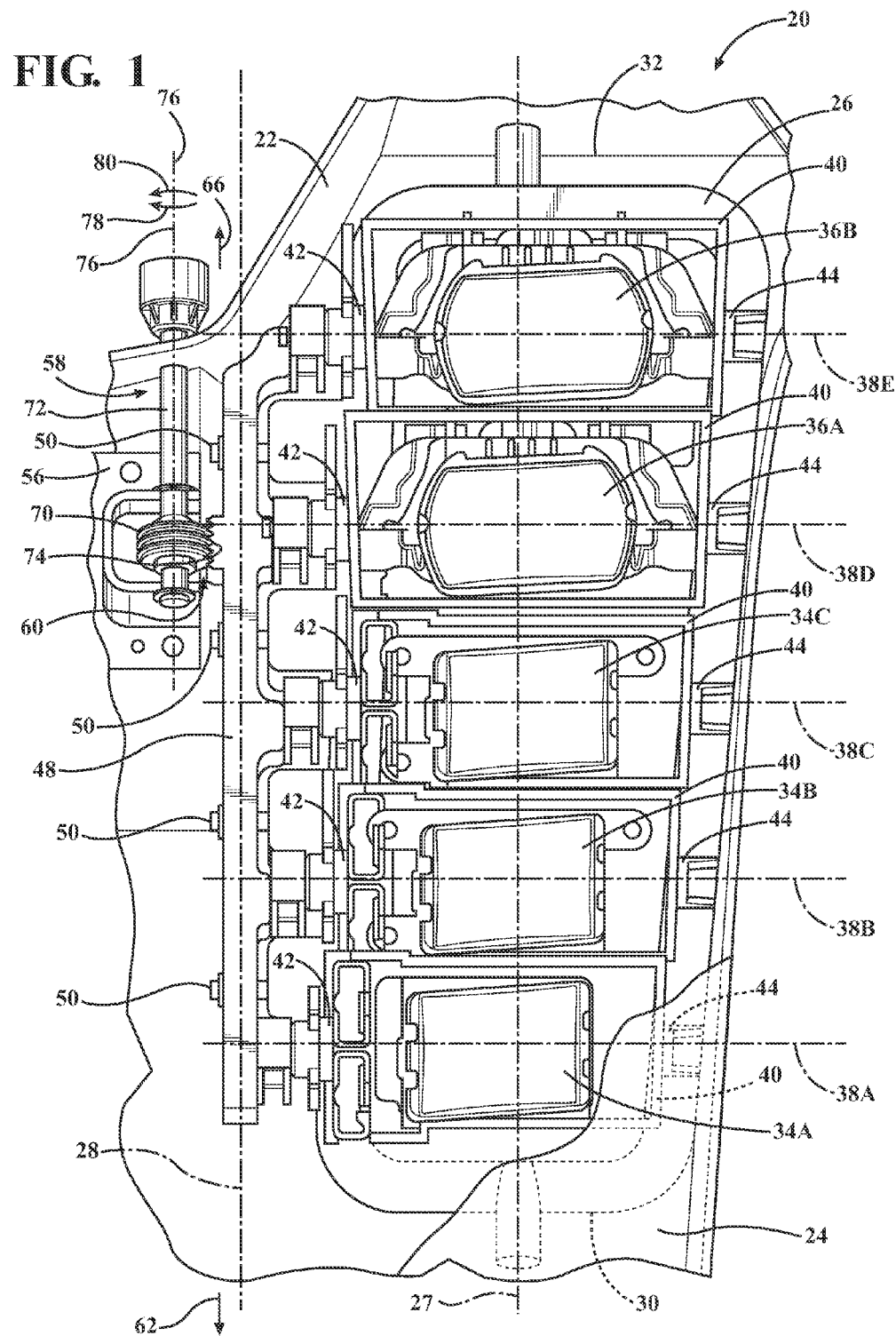
FIG. 1 is a schematic front view of a light assembly.
Figure 2:
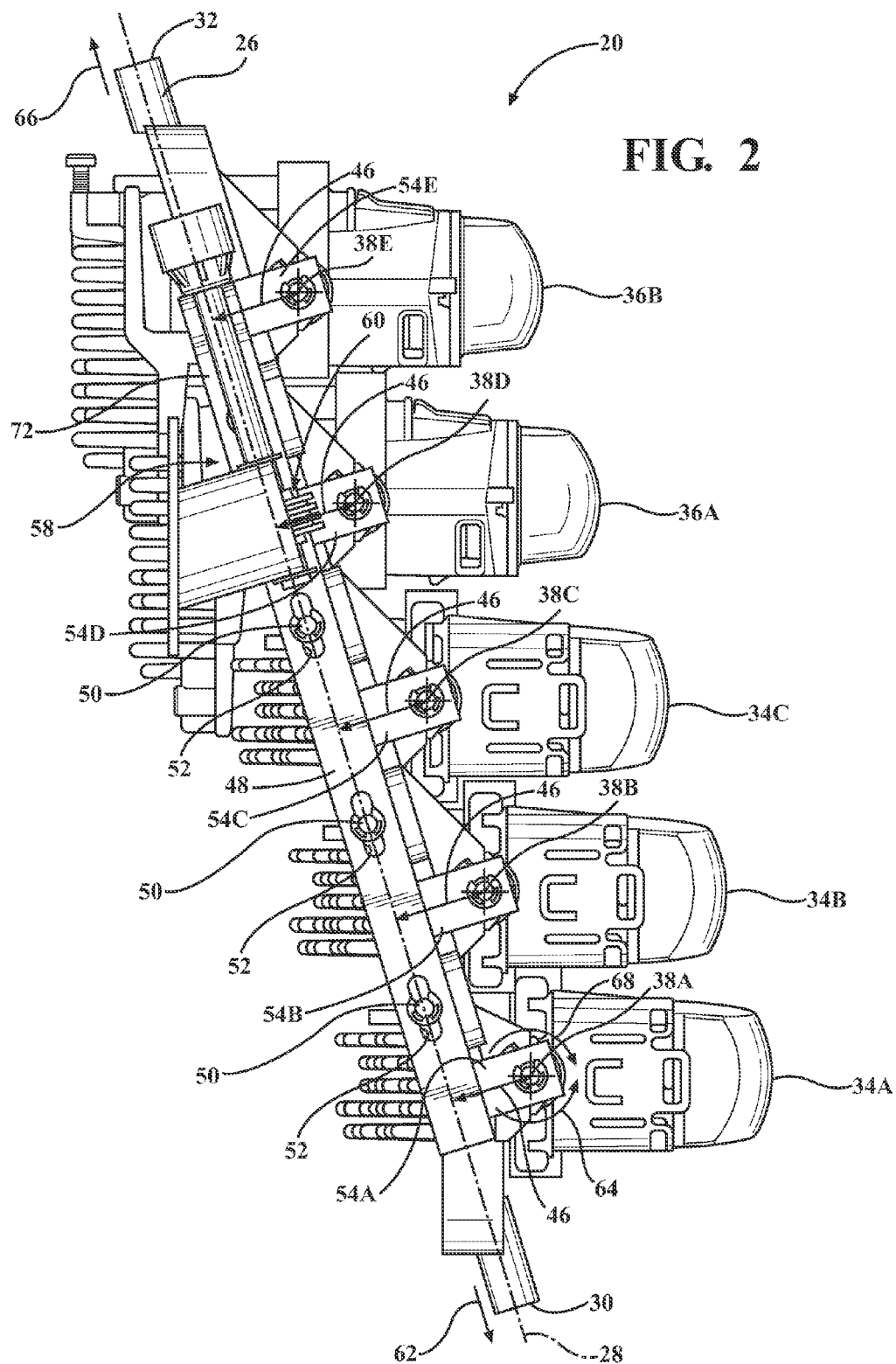
FIG. 2 is a schematic side view of the light assembly.

Referring to FIGS. 1 and 2, the light assembly 20 includes a housing 22. As shown in the exemplary embodiment of the Figures, the housing 22 is configured for attachment to a body of a vehicle. However, other applications may require that the housing 22 be configured differently than shown herein. The housing 22 is manufactured from a rigid material, such as but not limited to a metal or a plastic material. The housing 22 supports the various components of the light assembly 20, and provides a rearward or back cover for the components. A lens 24 is attached to and supported by the housing 22. The lens 24 is manufactured from a clear material, such as but not limited to a polycarbonate material. The lens 24 provides a front cover for the components of the light assembly 20, and allows the light to pass through. The housing 22 and the lens 24 cooperate to define an enclosed interior space therebetween, which encloses the components of the light assembly 20 and protects them from moisture, dirt, and debris.

The light assembly 20 includes a carrier 26. The carrier 26 is attached to and supported by the housing 22. The carrier 26 extends along a vertical rotation axis 27, between a lower end 30 and an upper end 32. The upper end 32 of the carrier 26 is disposed at a higher elevation than the lower end 30 of the carrier 26. The carrier 26 is rotatable relative to the housing 22 about the vertical rotation axis 27. The carrier 26 may be attached to the housing 22 in any suitable manner. In one exemplary embodiment, the carrier 26 is rotatably attached to the housing 22 for rotation about the vertical rotation axis 27 in an inboard and/or outboard direction, but remains non-rotatable relative to the carrier 26 about a longitudinal or horizontal axis, in an upward or downward direction. Alternatively, the carrier 26 may be fixedly attached to and not rotatable relative to the housing 22.

The light assembly 20 includes a plurality of high beam light modules, generally referred to herein by reference numeral 34, and a plurality of low beam light modules, generally referred to herein by reference numeral 36. In an exemplary embodiment, each of the high beam light modules 34 and the low beam light modules 36 include a Light Emitting Diode (LED). However, the high beam light modules 34 and the low beam light modules 36 may each include other types of light producing modules, other than the LED modules described herein.

Each of the high beam light modules 34 and each of the low beam light modules 36 are rotatably attached to the carrier 26, and rotatable relative to the carrier 26 about a respective horizontal module axis, generally referred to herein by reference numeral 38. Accordingly, it should be appreciated that each of the high beam light modules 34 is independent and separate from all of the other high beam light modules 34 and the low beam light modules 36, and each of the low beam light modules 36 is independent and separate from all of the other low beam light modules 36 and the high beam light modules 34. As such, the independent light modules (including both the high beam light modules 34 and the low beam light modules 36) are not directly connected to any of the other light modules.

The high beam light modules 34 and the low beam light modules 36 may be rotatable coupled to the carrier 26 in any suitable manner. For example, and as best shown in FIG. 1, each individual light module includes a frame 40, that includes a first arm 42 and a second arm 44 disposed on opposing lateral sides of the frame 40. The first arm 42 and the second arm 44 are co-axial, and define a respective horizontal module axis 38. The first arm 42 and the second arm 44 are attached to and supported by the carrier 26, allowing each independent light module to rotate about their respective horizontal module axis 38 relative to the carrier 26.

As shown, the exemplary embodiment of the light assembly 20 includes a first high beam light module 34A that is rotatably attached to the carrier 26 and rotatable relative to the carrier 26 about a first high beam horizontal axis 38A, a second high beam light module 34B that is rotatably attached to the carrier 26 and rotatable relative to the carrier 26 about a second high beam horizontal axis 38B, and a third high beam light module 34C that is rotatably attached to the carrier 26 and rotatable relative to the carrier 26 about a third high beam horizontal axis 38C. Additionally, the exemplary embodiment of the light assembly 20 includes a first low beam light module 36A that is rotatably attached to the carrier 26 and rotatable relative to the carrier 26 about a first low beam horizontal axis 38D, and a second low beam light module 36B rotatably attached to the carrier 26 and rotatable relative to the carrier 26 about a second low beam horizontal axis 38E. It should be appreciated that the number of high beam light modules 34 and the number of low beam light modules 36 may differ from the exemplary embodiment shown and described herein.

The high beam light modules 34 and the low beam light modules 36 are stacked vertically relative to each other along the vertical rotation axis 27. As shown in the exemplary embodiment, the first low beam light module 36A are stacked vertically below the second low beam light module 36B along the vertical rotation axis 27, with both the first low beam light module 36A and the second low beam light module 36B stacked vertically above the high beam light module 34. The first high beam light module 34A is stacked vertically below the second high beam light module 34B and the third high beam light module 34C along the vertical rotation axis 27, and the second high beam light module 34B is stacked vertically below the third high beam light module 34C. While the low beam light modules 36 are shown stacked vertically above the high beam light modules 34, it should be appreciated that the relative position of each may be reversed, such that the high beam light modules 34 are stacked vertically above the low beam light modules 36. Alternatively, it should be appreciated that the high beam light modules 34 and the low beam light modules 36 may be vertically intermixed, such as in an alternating vertical arrangement.

As described above, all of the high beam light modules 34 and all of the low beam light modules 36 are stacked vertically, one on top of another. With this arrangement, it should be appreciated that the respective horizontal module axis 38 of each of the light modules 34, 36 are arranged in a parallel configuration. Specifically, in the exemplary embodiment shown in the Figures and described herein, the first high beam horizontal axis 38A, the second high beam horizontal axis 38B, the third high beam horizontal axis 38C, the first low beam horizontal axis 38D, and the second low beam horizontal axis 38E are all substantially parallel with each other.

The light assembly 20 includes a main actuator bar 48, which extends along a bar axis 28. The main actuator bar 48 interconnects the plurality of high beam light modules 34 and the plurality of low beam light modules 36. Specifically, in the exemplary embodiment shown in the Figures and described herein, the main actuator bar 48 interconnects the first high beam light modules 34A, the second high beam light modules 34B, the third high beam light modules 34C, the first low beam light modules 36A, and the second low beam light modules 36B.

The bar axis 28 is perpendicular to the respective horizontal module axis 38 of each of the low beam light modules 36 and the high beam light modules 34. Specifically, in the exemplary embodiment shown in the Figures and described herein, the bar axis 28 is perpendicular to each of the first high beam horizontal axis 38A, the second high beam horizontal axis 38B, the third high beam horizontal axis 38C, the first low beam horizontal axis 38D, and the second low beam horizontal axis 38E.

The bar axis 28 is laterally spaced from the respective horizontal module axis 38 of each of the plurality of low beam light modules 36 and the plurality of high beam light modules 34 to define a respective lever arm distance 46 therebetween. Accordingly, each respective horizontal module axis 38 of each of the light modules is perpendicularly spaced from the bar axis 28 a distance that is equal to the lever arm distance 46. The lever arm distance 46 provides a mechanical advantage for rotating the respective light modules. Accordingly, the lever arm distance 46 may be defined to include any distance that is greater than zero, and will depend upon the amount of mechanical advantage required for the specific application.

The main actuator bar 48 is attached to and supported by the carrier 26, but is slideably moveable relative to the carrier 26 along the bar axis 28. The main actuator bar 48 may be attached to the carrier 26 in any manner that allows the main actuator bar 48 to move relative to the carrier 26 along the bar axis 28. The main actuator bar 48 only moves linearly along the bar axis 28. The main actuator bar does not rotate about the bar axis 28. For example, referring to FIG. 3, the carrier 26 may include a plurality of posts 50, and the main actuator bar 48 may include a plurality of slots 52 extending substantially along the bar axis 28. One of the posts 50 is slideably disposed within one of the slots 52 to slideably support the main actuator bar 48 relative to the carrier 26, and allow movement of the main actuator bar 48 relative to the carrier 26 generally along the bar axis 28.

Figure 3:
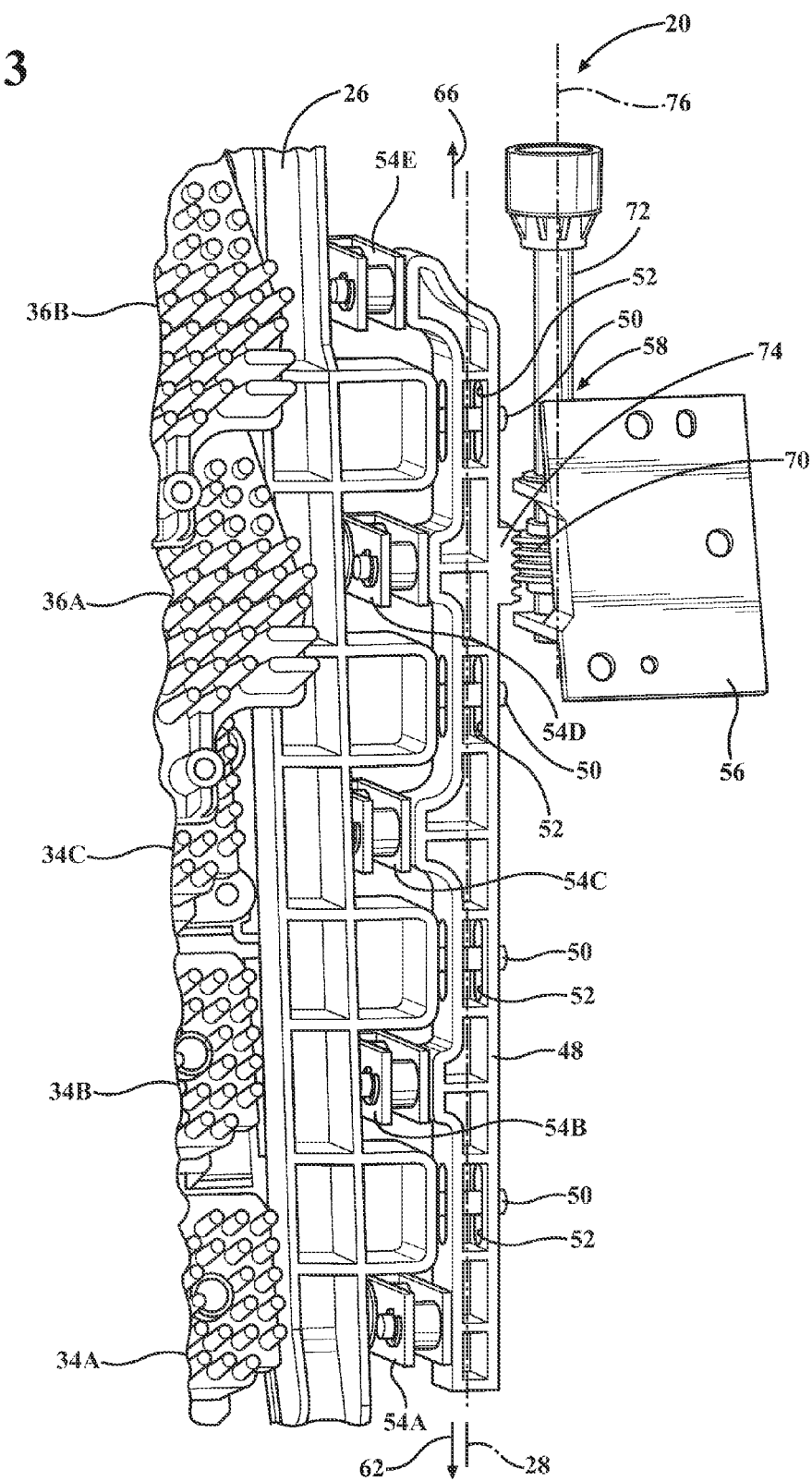
FIG. 3 is a schematic fragmentary perspective view of a rear of the light assembly.

Referring to FIGS. 2-3, the light assembly 20 further includes a plurality of links, generally referred to herein by reference numeral 54. One of the plurality of links 54 interconnects the main actuator bar 48 and one of the high beam light modules 34 or one of the low beam light modules 36. Each of the links 54 is rotatably connected to the main actuator bar 48 for rotation relative to the main actuator bar 48. Additionally, each of the links 54 is fixedly attached to its respective one of the low beam light modules 36 or high beam light modules 34, for rotation with its respective light module about its respective horizontal module axis 38. Accordingly, each link rotates with its respective light module about that light module's respective horizontal module axis 38.

In the exemplary embodiment shown in the Figures and described herein, the light assembly 20 includes a first link 54A, a second link 54B, a third link 54C, a fourth link 54D, and a fifth link 54E. The first link 54A interconnects the main actuator bar 48 and the first high beam light modules 34A. The first link 54A is rotatably attached relative to the main actuator bar 48, and is fixedly attached to the first high beam light modules 34A for rotation with the first high beam light modules 34A about the first high beam horizontal axis 38A. The second link 54B interconnects the main actuator bar 48 and the first low beam light modules 36A. The second link 54B is rotatably attached relative to the main actuator bar 48, and is fixedly attached to the first low beam light modules 36A for rotation with the first low beam light modules 36A about the first low beam horizontal axis 38D. The third link 54C interconnects the main actuator bar 48 and the second low beam light modules 36B. The third link 54C is rotatably attached relative to the main actuator bar 48, and is fixedly attached to the second low beam light modules 36B for rotation with the second low beam light modules 36B about the second low beam horizontal axis 38E. The fourth link 54D interconnects the main actuator bar 48 and the second high beam light modules 34B. The fourth link 54D is rotatably attached relative to the main actuator bar 48, and is fixedly attached to the second high beam light modules 34B for rotation with the second high beam light modules 34B about the second high beam horizontal axis 38B. The fifth link 54E interconnects the main actuator bar 48 and the third high beam light modules 34C. The fifth link 54E is rotatably attached relative to the main actuator bar 48, and is fixedly attached to the third high beam light modules 34C for rotation with the third high beam light modules 34C about the third high beam horizontal axis 38C.

The light assembly 20 includes a bracket 56, which is attached to and supported by the housing 22. Referring to FIG. 1, the bracket 56 rotatably supports an adjustment drive 58. In the exemplary embodiment shown and described herein, the adjustment drive 58 is coupled to the main actuator bar 48 via a worm gear drive 60. However, the adjustment drive 58 may be coupled to the main actuator bar 48 in some other manner not shown or described herein, other than the exemplary worm gear drive 60. The adjustment drive 58 is operable to move the main actuator bar 48 along the bar axis 28, to simultaneously rotate the high beam light modules 34 about the low beam light modules 36 about their respective horizontal module axis 38. Accordingly, movement of the main actuator bar 48 in a first direction 62 along the bar axis 28 simultaneously causes the light modules to rotate about their respective horizontal module axis 38 in a first rotational direction 64, and movement of the main actuator bar 48 in a second direction 66 along the bar axis 28, opposite the first direction 62, simultaneously causes the light modules to rotate about their respective horizontal module axis 38 in a second rotational direction 68, opposite the first rotational direction 64.

For example, movement of the main actuator bar 48 in the first direction 62 along the bar axis 28 simultaneously causes the first high beam light modules 34A to rotate about the first high beam horizontal axis 38A in the first rotational direction 64, the second high beam light modules 34B to rotate about the second high beam horizontal axis 38B in the first rotational direction 64, the third high beam light modules 34C to rotate about the third high beam horizontal axis 38C in the first rotational direction 64, the first low beam light modules 36A to rotate about the first low beam horizontal axis 38D in the first rotational direction 64, and the second low beam light modules 36B to rotate about the second low beam horizontal axis 38E in the first rotational direction 64. Similarly, movement of the main actuator bar 48 in the second direction 66 along the bar axis 28 simultaneously causes the first high beam light modules 34A to rotate about the first high beam horizontal axis 38A in the second rotational direction 68, the second high beam light modules 34B to rotate about the second high beam horizontal axis 38B in the second rotational direction 68, the third high beam light modules 34C to rotate about the third high beam horizontal axis 38C in the second rotational direction 68, the first low beam light modules 36A to rotate about the first low beam horizontal axis 38D in the second rotational direction 68, and the second low beam light modules 36B to rotate about the second low beam horizontal axis 38E in the second rotational direction 68.

As noted above, the adjustment drive 58 may be coupled to the main actuator bar 48 via the worm gear drive 60. It should be appreciated that the adjustment drive 58 may be coupled to the main actuator bar 48 in some other manner than shown and described herein, that is capable of allowing an input applied to the adjustment drive 58 to move the main actuator bar 48 along the bar axis 28. The exemplary worm gear drive 60 is formed or defined by annular threads 70 disposed on a shaft 72 of the adjustment drive 58, disposed in meshing engagement with horizontal threads 74 disposed on the main actuator bar 48. The horizontal threads 74 are generally perpendicular to the bar axis 28, and spaced from each other along the bar axis 28. The annular threads 70 generally form a spiral around the shaft 72 of the adjustment drive 58, and extend along a shaft axis 76 that is generally parallel with the bar axis 28. Rotation of the adjustment drive 58 about the shaft axis 76 moves the main actuator bar 48 along the bar axis 28 to simultaneously rotate the plurality of high beam light modules 34 and the plurality of low beam light modules 36 about their respective horizontal module axis 38. Rotation of the adjustment drive 58 in a clockwise direction 78 moves the main actuator bar 48 in either the first direction 62 or the second direction 66, and rotation of the adjustment drive 58 in a counterclockwise direction 80 moves the main actuator bar 48 in the other of the first direction 62 or the second direction 66.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A headlamp assembly for a vehicle, the headlamp assembly comprising:
   a carrier;
   a first light module rotatably attached to the carrier and rotatable relative to the carrier about a first horizontal axis;
   a second light module rotatably attached to the carrier and rotatable relative to the carrier about a second horizontal axis;
   wherein the first horizontal axis and the second horizontal axis are parallel with each other;
   a main actuator bar interconnecting the first light module and the second light module; and
   an adjustment drive coupled to the main actuator bar and operable to move the main actuator bar along a bar axis to simultaneously rotate the first light module about the first horizontal axis and the second light module about the second horizontal axis;
   wherein the carrier includes a plurality of posts, and the main actuator bar includes a plurality of slots extending substantially along the bar axis, with one of the plurality of posts slideably disposed within one of the plurality of slots to slideably support the main actuator bar relative to the carrier and allow movement of the main actuator bar relative to the carrier generally along the bar axis.

2. The headlamp assembly set forth in claim 1 wherein the main actuator bar extends along the bar axis, wherein the bar axis is perpendicular to both the first horizontal axis and the second horizontal axis, and wherein the bar axis is laterally spaced from both the first horizontal axis and the second horizontal axis a lever arm distance.

3. The headlamp assembly set forth in claim 2 further comprising a worm gear drive interconnecting the adjustment drive and the main actuator bar.

4. The headlamp assembly set forth in claim 3 wherein the adjustment drive includes a shaft defining annular threads, and the main actuator bar includes horizontal threads spaced from each other along the bar axis, wherein the annular threads and the horizontal threads are disposed in meshing engagement with each other and define the worm gear drive.

5. The headlamp assembly set forth in claim 1 further comprising a first link interconnecting the main actuator bar and the first light module, and a second link interconnecting the main actuator bar and the second light module.

6. The headlamp assembly set forth in claim 5 wherein the first link and the second link are each rotatably connected to the main actuator bar for rotation relative to the main actuator bar.

7. The headlamp assembly set forth in claim 6 wherein the first link is fixedly attached to the first light module for rotation with the first light module about the first horizontal axis, and wherein the second link is fixedly attached to the second light module for rotation with the second light module about the second horizontal axis.

8. The headlamp assembly set forth in claim 1 wherein the carrier extends along a vertical rotation axis, between a lower end and an upper end, with the upper end disposed at a higher elevation than the lower end.

9. The headlamp assembly set forth in claim 8 wherein the first light module and the second light module are stacked vertically relative to each other along the vertical rotation axis.

10. The headlamp assembly set forth in claim 1 further comprising a housing configured for attachment to a body of a vehicle, wherein the carrier is attached to and supported by the housing.

11. The headlamp assembly set forth in claim 10 further comprising a lens attached to and supported by the housing.

12. The headlamp assembly set forth in claim 10 further comprising a bracket attached to and supported by the housing, wherein the bracket rotatably supports the adjustment drive.

13. The headlamp assembly set forth in claim 1 wherein:
   the first light module includes a first high beam light module;
   the first horizontal axis is further defined as a first high beam horizontal axis;
   the second light module includes a first low beam light module; and
   the second horizontal axis is further defined as a first low beam horizontal axis.

14. The headlamp assembly set forth in claim 13 further comprising:
   a second low beam light module rotatably attached to the carrier and rotatable relative to the carrier about a second low beam horizontal axis;
   a second high beam light module rotatably attached to the carrier and rotatable relative to the carrier about a second high beam horizontal axis;
   a third high beam light module rotatably attached to the carrier and rotatable relative to the carrier about a third high beam horizontal axis;
   wherein the main actuator bar interconnects the first high beam light module, the second high beam light module, the third high beam light module, the first low beam light module, and the second low beam light module;
   wherein the first high beam horizontal axis, the second high beam horizontal axis, the third high beam horizontal axis, the first low beam horizontal axis, and the second low beam horizontal axis are all parallel with each other; and
   wherein movement of the adjustment main actuator bar simultaneously moves all of the first high beam light module about the first high beam horizontal axis, the second high beam light module about the second high beam horizontal axis, the third high beam light module about the third high beam horizontal axis, the first low beam light module about the first low beam horizontal axis, and the second low beam light module about the second low beam horizontal axis.

15. A light assembly comprising:
   a carrier;
   a plurality of first light modules, with each of the plurality of first light modules rotatably attached to the carrier and rotatable relative to the carrier about a respective horizontal module axis;
   a plurality of second light modules, with each of the plurality of second light modules rotatably attached to the carrier and rotatable relative to the carrier about a respective horizontal module axis;
   wherein the plurality of first light modules and the plurality of second light modules are stacked vertically relative to each other along a vertical rotation axis;
   a main actuator bar extending along a bar axis, and interconnecting the plurality of first light modules and the plurality of second light modules;
   wherein the main actuator bar includes horizontal threads extending along the bar axis;
   an adjustment drive defining annular threads disposed in meshing engagement with the horizontal threads of the main actuator bar, wherein rotation of the adjustment drive about a shaft axis moves the main actuator bar along the bar axis to simultaneously rotate the plurality of first light modules and the plurality of second light modules about their respective horizontal module axis.

16. The light assembly set forth in claim 15 wherein the bar axis is perpendicular to the respective horizontal module axis of each of the plurality of second light modules and the plurality of first light modules, and wherein the bar axis is laterally spaced from the respective horizontal module axis of each of the plurality of second light modules and the plurality of first light modules to define a respective lever arm distance therebetween.

17. The light assembly set forth in claim 16 further comprising a plurality of links, with one of the plurality of links interconnecting the main actuator bar and one of the plurality of first light modules or one of the plurality of second light modules.

18. The light assembly set forth in claim 17 wherein each of the plurality of links are rotatably connected to the main actuator bar for rotation relative to the main actuator bar, and wherein each of the plurality of links is fixedly attached to its respective one of the plurality of second light modules or first light modules for rotation with its respective light module about a respective horizontal module axis.

19. The light assembly set forth in claim 15 wherein the carrier includes a plurality of posts, and the main actuator bar includes a plurality of slots extending substantially along the bar axis, with one of the plurality of posts slideably disposed within one of the plurality of slots to slideably support the main actuator bar relative to the carrier and allow movement of the main actuator bar relative to the carrier generally along the bar axis.

* * * * *